INVENTOR.
MASAYASU ARIKAWA,
IZUMI ICHIHARA,

United States Patent Office 3,118,053
Patented Jan. 14, 1964

3,118,053
COMPOSITE WELDING WIRE
Masayasu Arikawa, Nada-ku, Kobe, and Izumi Ichihara, Nishinomiya, Japan, assignors to Kobe Steel Works, Ltd., Kobe, Japan
Filed Nov. 9, 1961, Ser. No. 151,364
2 Claims. (Cl. 219—146)

This invention relates to a consumable welding wire, particularly to a consumable cored or composite wire for use in an automatic metal-arc welding process.

A welding wire for use in an automatic metal-arc welding is required to be flexible so as to be unwound from a reel and fed to the welding position. For such welding wire, a single solid wire, e.g. a single bare filler wire, has commonly been used.

However, with the recent development of welding applications, it has come to be required to weld every kind of metal, particularly an alloy steel. A conventional single solid wire can not satisfy this demand. In welding an alloy steel it is required to employ a wire of a material which is well matched with that of the base to be welded. It is difficult, however, to manufacture an alloy wire. Furthermore, even when an alloy wire is used, the arc is unstable with too much spatter so that a metal deposit which is well suited to the base material is difficult to be obtained.

To overcome these difficulties, there have been proposed some types of the so-called "cored wire," certain of which is being actually used. A cored wire consists of a metal part combined with a powder part, the whole being in the shape of wire. The powder part consists of a flux or a mixture of a flux and other additive. A typical one of the conventional cored wires is made by folding an elongated iron sheet strip along its length to define a narrow space therein and filling the space with a powder. Thus the metal part is exposed and the powder is enclosed by the external metal part. This type of wire is convenient in various respects, for example it is flexible (although there is contained a powder or flux) so that it can be wound up on a reel like as a single solid wire, and an electric current can conveniently be passed through the outer metal part. This cored wire is more advantageous than a single solid wire is having the powder portion in addition to the metal portion. Thus by selecting the nature or composition of the powder the cored wire can be adapted to various uses to which a conventional single solid wire has been not applicable. Thus, for example, a cored wire, if a flux is used as the powder enclosed by the metal part, makes it possible to employ a flux which has been impossible to be employed together with a solid single wire. Furthermore, an arc stabilizing agent can be mixed with the flux, thereby a stabilized welding can be carried out (with less spatter) even with an alternating current, and also a bead with an excellent appearance is obtainable. When a suitably selected alloying element powder is used as a portion of the powder to be enclosed with the metal part, the resulting cored wire will be able to produce a metal deposit well matched with the material of a base metal. This is particularly significant when the base material is an alloy steel.

While the conventional cored wires as explained above have various advantages over single solid wires, they are not fully satisfactory. As explained above, a conventional cored wire is of the structure that a thin metal strip is folded several times or folds to define therein a narrow space in which is filled a powder. However, in fold-working such a thin metal sheet several times, the material is hardened so that it can not be used unless it is subjected to annealing. Since the metal sheet must be folded several times the material which can be used is restricted. Therefore, where relatively many or much alloying elements are required, it is necessarily essential to use them in the form of powder, with the result that the metal sheet should be exceedingly thin and there is caused spatter in welding operation. Furthermore, when the metal sheet is so exceedingly thin, there is a danger that the cored wire made thereof is broken in unwinding the same from the reel and feeding to the welding position.

It is an object of this invention to provide a novel composite wire useful as a welding wire for use in automatic metal-arc welding process.

It is another object of this invention to provide a novel composite wire having a metal part and a powder part.

It is another object of this invention to provide a novel composite wire having a metal part and a powder part, said metal part comprising at least two members, one of which is a single solid wire while the other is double tubular.

It is another object of this invention to provide a novel composite wire of the type described wherein a flux or alloying element is incorporated in the form of powder.

It is still another object of this invention to provide a novel composite wire of the type described and in which alloying element is present in the form of metal member and not in the form of powder.

It is still another object of this invention to provide a novel composite wire of the type described in which the powder part contains a gas developing agent in addition to the flux or alloying element.

Another object of this invention is to provide a novel composite wire of the type described and which makes it possible to effect welding of various alloy steels in good working condition and to produce a metal deposit of a nature close to that of the base material.

To accomplish these objects, a composite wire of this invention has a special structure. Briefly, according to the present invention, a metal part of a composite wire consists of at least two separate or individual members, one of said members being a centre or more wire extending longitudinally of the composite wire at its centre and the other comprising at least two tubes. The innermost tube encircles and contacts with the core or centre wire, and an annular space defined between the inner tube and outer tube is filled with a powder.

Since the composite wire of this invention comprises more than two metal members, it is possible to adapt the same for various applications by suitably selecting the materials for these members. Usually, a soft steel is used for the tubular, while the centre or core wire may be selected from various materials such as soft steel and alloying elements. This variety is further increased because an alloying element can be incorporated also as one ingredient of the powder to be filled in the space between the tubes. Thus by varying the materials for the core wire and powders, the amount and kind of alloying element(s) which can be incorporated in the composite wire of this invention may be varied over a wide range. Since the composite wire of this invention consists of a core wire and double tubular member which both are constructed in a well defined or uniform shape, the cross sectional shapes of the annular space between the tubes as well as the metal members are substantially uniform throughout the length, uniform current density is obtained and the arc is also stabilized. According to the structure of composite wire of this invention, most of the metal members is placed internally within the surrounding powder or flux, the flow of the molten metal during the welding operation is substantially ideal and spattering is minimized. Particularly, since the tubular member and the centre wire are electrically closely contacted with each other, the welding current, even when passed to the outer tube, passes uniformly through the centre core so that all the metal part is uniformly arc-molten at all times.

The structure mentioned above may be modified without departing from the invention. Thus, for example, a gas developing agent can be used as an ingredient of the powder. By this arrangement, the gas developed from the flux during welding will shield the welding area, so that the use of a separate shielding gas is eliminated or minimized. If desired, an alloying element such as aluminum or nickel can be incorporated in this composite wire as a fine wire inserted in the powder part. By this arrangement, more alloying element(s) can be incorporated so as to be adapted to the particular alloy steel to be welded. It is also possible to mount another double tubular member externally of the first double tubular member so that two different powders are filled respectively in the annular spaces formed in the first or inner double tubular member and in the second or outer double tubular member. For example, the inner space is filled with a flux while the outer space is filled with a shielding gas generating agent.

The invention will be described in more detail with reference to the accompanying drawings in which.

Figure 1:
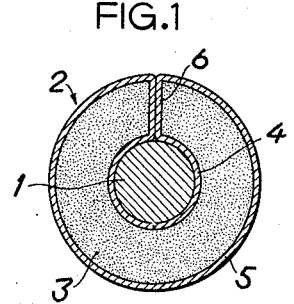
FIG. 1 is an enlarged cross section of a composite wire of this invention.

Referring to the drawings, and more particularly to FIG. 1, the composite wire includes a centre or core wire 1 and a double tubular member 2. It will be understood that both the wire 1 and the tubular member 2 extend longitudinally along the entire length of the composite wire. The centre or core wire 1 consists of a solid single wire. The double tubular member 2 is made by bending a single thin metal sheet and comprises an inner tube 4 and an outer tube 5 with an annular space therebetween. As shown, the inner tube 4 surrounds and is in close contact with the core wire 1. The outer tube 5 is arranged concentrically with but spaced from the inner tube 4. The outer tube 5 forms an outer shell or envelope. Since the tubular member is shaped from a single metal sheet in a manner as explained below, these two tubes are integrally connected with each other by a wall 6 extending radially and across the space between these tubes. Therefore, if a welding current is applied to the outer tube it flows through the wall 6 and the inner tube 4 to the core wire 1. The annular space between the inner tube 4 and outer tube 5 is filled with a powder 3.

The composite wire of this structure may be fabricated as follows:

A hoop iron or an elongated metal sheet strip is bent and formed in a channel shape and the powder is filled in the space. Then the edge walls are brought inwardly and toward each other to wrap the powder. Then the wire 1 is placed on this assembly and the whole is bent to wrap the wire 1 therein as a core. This assembly is drawn through a die or cold rolled for final shaping.

Usually, a hoop of mild steel is used to form the tubular member 2, while the wire 1 may be mild steel or non-ferrous metal such as aluminium, nickel, titanium or an alloy depending upon the particular use intended. The powder 3 may be usual flux, for example, a mixture of rutile, silica, fluorspar, feldspar, etc. If desired, a gas developing agent, for example a carbonate such as lime stone, and/or a deoxidizing agent such as ferromanganese, ferrosilicon, and/or an alloying element may be incorporated into the flux.

Generally, it is preferable that the core wire 1 is about 1 mm. in diameter and the tubular member 2 is about 0.2 mm. in thickness. The composite wire may be about 2.5 mm.–4 mm. in diameter so as to be sufficiently flexible.

Figure 2:
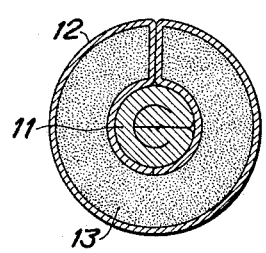
FIG. 2 is an enlarged cross section of a modified composite wire of this invention.

The embodiment shown in FIG. 2 is identical with that of FIG. 1 except that the centre wire 11 is not a solid wire but is constructed by folding a hoop into a wire shape.

It is also possible to employ a pipe instead of the wire 1 (FIG. 1) or wire 11 (FIG. 2) and to fill a powder in said pipe.

Figure 3:
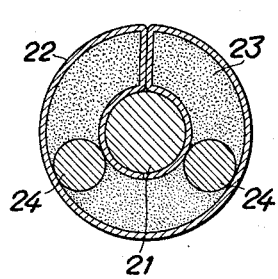
FIG. 3 is an enlarged cross section of another embodiment of this invention.

The embodiment shown in FIG. 3 is particularly useful as an alloy welding wire. The centre wire 21 may be of any desired metal such as aluminium, steel, stainless steel or titanium. The tubular member 22 may be made of a mild steel sheet. In the powder 23 there are inserted a desired number (preferably one or two as shown) of fine wires 24, 24 made of any desired metal such as aluminium, pure iron, copper, nickel, etc.

The composite wire of this embodiment has fine wires 24 in addition to the powder 23, and therefore various combinations of flux and alloying element(s) can be taken. The fine wire 24 is well protected and therefore there is no danger of breaking. The composite wire, therefore, is useful for welding of an alloy steel such as aluminium steel or chromium alloy.

Figure 4:
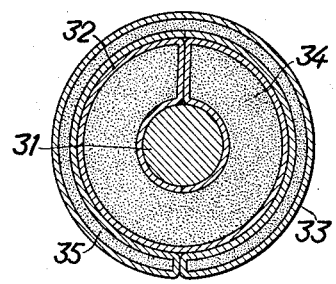
FIG. 4 is an enlarged cross section of still another embodiment of the present invention.

In the embodiment shown in FIG. 4, the arrangement of the core 31, tubular member 32 and powder 34 is identical with that of the core 1, tubular member 2 and powder 3 of FIG. 1. The structure of FIG. 4 is different from that of FIG. 1 in providing an outer double tubular member 33 as shown. In an annular space formed between the inner tube and outer tube of the double tubular member 33 there is filled a powder 35. The inner tube of the outer double tubular member 33 encircles and is in close contact with the outer tubular member of the inner double tubular member 32, and the inner and outer tubes of the outer double tubular member 33 are connected with each other by a wall similar to the wall 6 of FIG. 1. Therefore, when a welding current is applied to the outer tube of the outer tubular member 33 it also passes through the core 31 through the inner double tubular member 32.

The feature of this construction is in the fact that there are two different powder sections 34, 35. Thus, for example, a common flux or metal powder 34 is filled in the space of the inner double tubular member 32, while a gas developing agent powder 35 is filled in the space of the outer double tubular member 33. According to this arrangement, the gas from the outer powder section 35 will be cylindrically developed and protect the arc within the cylindrical gas shield so that the arc is stabilized and spatter is minimized. Since the welding area is gas shielded no separate gas shielding means is required. Any suitable gas developing agent such as calcium carbonate or magnesium carbonate may be used. Furthermore, this two powder receiving section arrangement is useful in employing two different agents which would tend to react with each other.

*Example 1*

A composite wire shown in FIG. 1 was employed. The outer diameter of the wire was 3.2 mm. The core wire 1 was a mild steel wire of 1.4 mm. diameter and the double tubular member 2 was made of a 0.2 mm. thickness mild steel sheet. The flux 3 was the following composition (percent):

| | |
|---|---|
| Rutile | 45 |
| Silica | 22 |
| Limestone | 3 |
| Fluorspar | 2 |
| Ferromanganese | 18 |
| Arc-stabilizer | 5 |
| Feldspar | 5 |

Using this composite wire, a mild steel base member and a 50 kg./mm.² grade high tension steel base member were welded. The composition of the base metal and the composition of the metal deposit obtained are as follows:

|  | C | Mn | Si |
|---|---|---|---|
| Base metal | 0.16 | 0.56 | 0.01 |
| Metal deposit | 0.07 | 0.71 | 0.39 |

*Example 2*

A composite wire shown in FIG. 1 was employed. The outer diameter of the wire was 3.2 mm. The core wire 1 was a 25Cr—20Ni steel wire of 2.0 mm. diameter and the double tubular member 2 was made of a mild steel sheet of 0.1 mm. thickness. The flux 3 was of the following composition (percent):

Rutile ------------------------------------------- 35
Dolomite ----------------------------------------- 20
Limestone ---------------------------------------- 5
Ferromanganese ----------------------------------- 10
Metallic chromium -------------------------------- 4
Silica ------------------------------------------- 6
Potash feldspar ---------------------------------- 14
Arc-stabilizer ----------------------------------- 6

By using this composite wire a 18Cr—8Ni stainless steel was welded. The composition of the base metal material and that of the metal deposit obtained are as follows:

|  | C | Mn | Si | Ni | Cr |
|---|---|---|---|---|---|
| Base metal | 0.07 | 0.99 | 0.55 | 8.59 | 18.35 |
| Metal deposit | 0.07 | 1.20 | 0.45 | 10.24 | 18.65 |

*Example 3*

A composite wire of FIG. 3 was employed. The outer diameter of the wire was 3.2 mm. The core wire 21 was a mild steel wire of 1.0 mm. diameter and the double tubular member 22 was made of a mild steel sheet of 0.2 mm. thickness. Two wires 24 were employed, each being an aluminium wire of 0.8 mm. diameter. The flux 23 was of the following composition (percent):

Limestone ---------------------------------------- 37
Cryolite ----------------------------------------- 12
Rutile ------------------------------------------- 30
Ferrosilicon ------------------------------------- 10
Ferromanganese ----------------------------------- 5
Arc-stabilizer ----------------------------------- 6

By using this composite wire a 4% aluminum steel was welded. As a result, the content of aluminium in the metal deposit was about 4.5%

*Example 4*

A composite wire shown in FIG. 4 was employed. The outer diameter of the wire was 4.0 mm. The core wire 31 was a mild steel of 1.6 mm. diameter and each of the tubular members was made from a mild steel sheet of 0.2 mm. thickness. The outer space 35 was filled with limestone, while the inner space 34 was filled with a flux of the following composition (percent):

Rutile ------------------------------------------- 40
Feldspar ----------------------------------------- 6
Silica ------------------------------------------- 20
Fluorspar ---------------------------------------- 4
Ferromanganese ----------------------------------- 25
Ferromolybdenum ---------------------------------- 5

By using this composite wire a 60 kg./mm.$^2$ grade high tension steel was welded. The limestone served as carbon dioxide gas developing agent. As a result, the following composition of a metal deposit as compared with that of the base metal was obtained.

|  | C | Mn | Si | Mo |
|---|---|---|---|---|
| Base metal | 0.17 | 1.22 | 0.48 | 0.20 |
| Metal deposit | 0.09 | 1.30 | 0.35 | 0.30 |

What we claim is:
1. A welding wire, comprising in combination:
   (a) a shell formed from a single sheet of thin metallic material, said shell defining a spaced outer tube and inner tube connected together and defining a space therebetween, the free edges thereof abutting and disposed longitudinally of the inner tube;
   (b) a central core metal wire disposed within and in close contact with said inner tube;
   (c) another shell constructed similarly as the first mentioned shell, but of a size large enough to accommodate the latter therein and be in contact therewith; and
   (d) powder materials disposed in the spaces of said shells with the powder material in the outer shell being a shielding gas developing agent.
2. A wire as defined in claim 1 wherein the powder material in the inner shell is a flux material.

References Cited in the file of this patent
UNITED STATES PATENTS

| 1,629,748 | Stoody | May 24, 1927 |
| 1,995,584 | Sarazin | Mar. 26, 1935 |
| 2,552,176 | Hummitzch | May 8, 1951 |
| 2,785,285 | Bernard | Mar. 12, 1957 |